US011620978B2

(12) United States Patent
Yun et al.

(10) Patent No.: US 11,620,978 B2
(45) Date of Patent: Apr. 4, 2023

(54) AUTOMATIC INTERPRETATION APPARATUS AND METHOD

(71) Applicant: Electronics and Telecommunications Research Institute, Daejeon (KR)

(72) Inventors: Seung Yun, Daejeon (KR); Sang Hun Kim, Sejong-si (KR); Min Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 220 days.

(21) Appl. No.: 16/990,482

(22) Filed: Aug. 11, 2020

(65) Prior Publication Data

US 2021/0049997 A1  Feb. 18, 2021

(30) Foreign Application Priority Data

Aug. 14, 2019 (KR) .................... 10-2019-0099935
Jul. 23, 2020 (KR) .................... 10-2020-0091907

(51) Int. Cl.
*G10L 13/033* (2013.01)
*G10L 15/00* (2013.01)
*G06F 40/58* (2020.01)
*G10L 25/69* (2013.01)
(Continued)

(52) U.S. Cl.
CPC .......... *G10L 13/0335* (2013.01); *G06F 40/58* (2020.01); *G10L 15/005* (2013.01); *G10L 15/16* (2013.01); *G10L 25/69* (2013.01); *G10L 25/75* (2013.01)

(58) Field of Classification Search
None
See application file for complete search history.

(56) References Cited

U.S. PATENT DOCUMENTS 9,922,641 B1 * 3/2018 Chun .................... G10L 15/07
10,108,606 B2 10/2018 Yun et al.
10,522,134 B1 * 12/2019 Matsoukas .............. G10L 15/30
(Continued)

FOREIGN PATENT DOCUMENTS

KR  10-2017-0103209  9/2017
KR  10-2019-0008137  1/2019
KR  10-2019-0085883  7/2019

*Primary Examiner* — Jialong He
*Assistant Examiner* — Keisha Y. Castillo-Torres
(74) *Attorney, Agent, or Firm* — Kile Park Reed & Houtteman PLLC

(57) ABSTRACT

An automatic interpretation method performed by a correspondent terminal communicating with an utterer terminal includes receiving, by a communication unit, voice feature information about an utterer and an automatic translation result, obtained by automatically translating a voice uttered in a source language by the utterer in a target language, from the utterer terminal and performing, by a sound synthesizer, voice synthesis on the basis of the automatic translation result and the voice feature information to output a personalized synthesis voice as an automatic interpretation result. The voice feature information about the utterer includes a hidden variable including a first additional voice result and a voice feature parameter and a second additional voice feature, which are extracted from a voice of the utterer.

11 Claims, 7 Drawing Sheets

(51) Int. Cl.
    *G10L 25/75*     (2013.01)
    *G10L 15/16*     (2006.01)

(56) References Cited

U.S. PATENT DOCUMENTS

| | | | |
|---|---|---|---|
| 2006/0031073 A1* | 2/2006 | Anglin | G10L 17/26 |
| | | | 704/E17.002 |
| 2008/0133245 A1* | 6/2008 | Proulx | G06F 40/55 |
| | | | 704/277 |
| 2014/0303958 A1* | 10/2014 | Lee | G06F 40/58 |
| | | | 704/2 |
| 2017/0255616 A1* | 9/2017 | Yun | G10L 25/48 |
| 2019/0019500 A1* | 1/2019 | Jang | G10L 15/063 |
| 2020/0082806 A1 | 3/2020 | Kim et al. | |

* cited by examiner

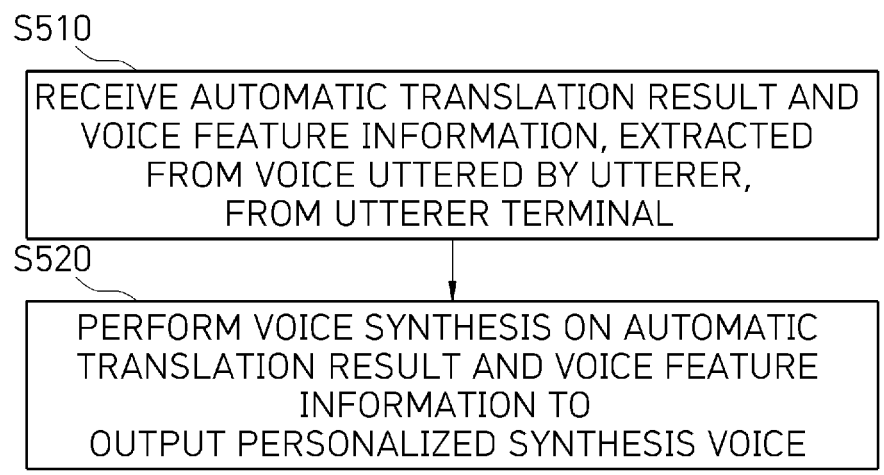

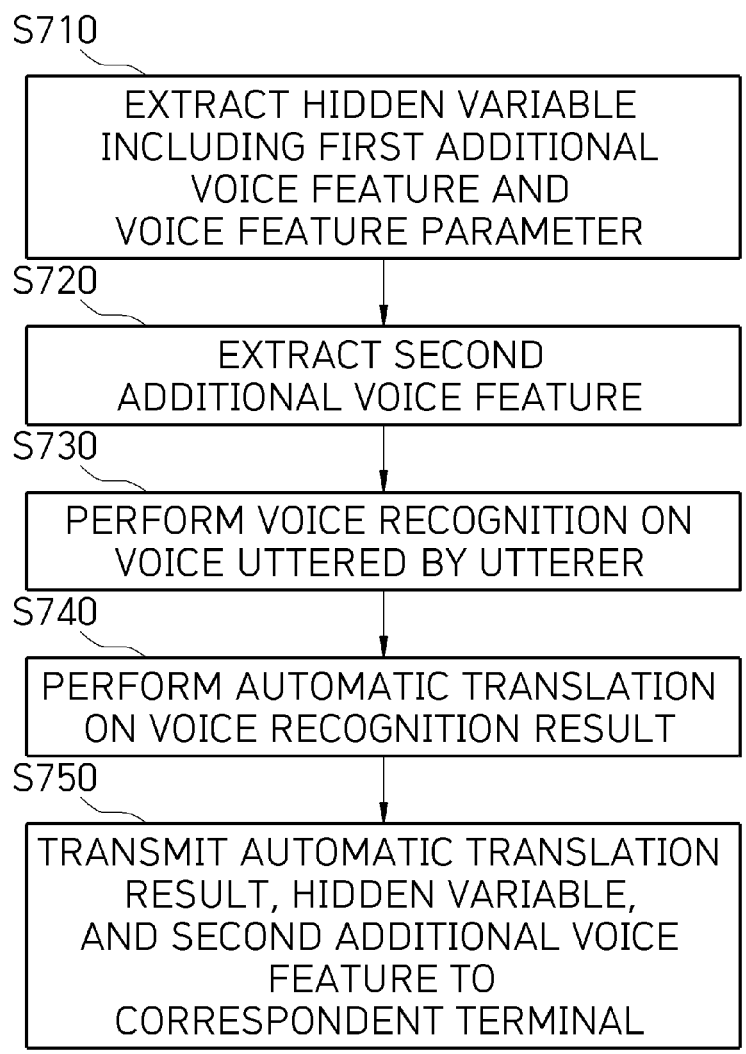

AUTOMATIC INTERPRETATION APPARATUS AND METHOD

CROSS-REFERENCE TO RELATED APPLICATIONS

This application claims priority under 35 U.S.C. § 119 to Korean Patent Application No. 10-2019-0099935, filed on Aug. 14, 2019 and Korean Patent Application No. 10-2020-0091907, filed on Jul. 23, 2020, the disclosure of which is incorporated herein by reference in its entirety.

TECHNICAL FIELD

The present invention relates to automatic interpretation technology.

BACKGROUND

Automatic interpretation technology denotes technology that recognizes a voice uttered in a specific language by an utterer, converts the recognized voice into another specific language through a process such as automatic translation, and outputs a converted voice as text-type subtitles or as a synthesis voice synthesized with a voice.

Recently, as interest in voice synthesis among main technologies for automatic interpretation increases, personalized voice synthesis instead of simple communication is being researched.

Personalized voice synthesis denotes technology that outputs a target language, converted (translated) from a source language through voice recognition and automatic translation, as a synthesis voice similar to an utterance tone (or an utterance style) of an utterer.

Recently, a number of users possess a personal terminal such as a smartphone, and as overseas trip is generalized, a personal terminal with an automatic interpretation function fundamentally installed therein and various applications associated with automatic interpretation are being released.

A personal terminal of an utterer (hereinafter referred to as an utterer terminal) may automatically translate a voice, uttered in a source language by an utterer, in a target language and may reproduce the target language as a personalized synthesis voice similar to an utterance tone of the utterer through a personalized voice synthesis process.

However, in a case where a terminal of another user (hereinafter referred to as a correspondent terminal) desires to reproduce a personalized synthesis voice similar to an utterer voice as an automatic interpretation result, the utterer terminal should provide a source voice file of an utterer to the correspondent terminal, and the correspondent terminal should analyze the voice file provided from the utterer terminal to extract pieces of information associated with a voice feature of the utterer.

Subsequently, the correspondent terminal synthesizes the extracted information, associated with the voice feature of the utterer, with a translation translated by the correspondent terminal to perform voice synthesis, and thus, reproduces a personalized synthesis voice similar to the voice of the utterer as an automatic interpretation result.

As described above, because the correspondent terminal should extract a voice feature from the source voice file provided from the utterer terminal so as to reproduce a personalized synthesis voice similar to the voice of the utterer as an automatic interpretation result, a processing time needed for extracting a voice feature is a cause which reduces the real-time processing performance of automatic interpretation.

Transmission delay caused by a communication environment may occur in a process of transmitting a source voice file from an utterer terminal to a correspondent terminal, and the transmission delay is a cause which reduces the real-time processing performance of automatic interpretation.

Moreover, in a voice synthesis process based on automatic interpretation technology of the related art, it is impossible to convert a personalized synthesis voice into a tone desired by a user.

SUMMARY

Accordingly, the present invention provides an automatic interpretation apparatus and method in which an utterer terminal may output, as an automatic interpretation result, a personalized synthesis voice similar to a voice (or tone) of an utterer even without transmitting a source voice file of an utterer to a correspondent terminal.

The present invention also provides an automatic interpretation apparatus and method for freely adjusting and converting a tone of a personalized synthesis voice.

The advantages, features and aspects of the present invention will become apparent from the following description of the embodiments with reference to the accompanying drawings, which is set forth hereinafter.

In one general aspect, an automatic interpretation method performed by a correspondent terminal communicating with an utterer terminal includes: receiving, by a communication unit, voice feature information about an utterer and an automatic translation result, obtained by automatically translating a voice uttered in a source language by the utterer in a target language, from the utterer terminal; and performing, by a sound synthesizer, voice synthesis on the basis of the automatic translation result and the voice feature information to output a personalized synthesis voice as an automatic interpretation result. The voice feature information about the utterer includes a hidden variable including a voice feature parameter and a first additional voice result and a second additional voice feature, which are extracted from a voice of the utterer.

In another general aspect, an automatic interpretation method performed by an utterer terminal communicating with a correspondent terminal includes: extracting, by a first voice feature extractor, a hidden variable including a voice feature parameter and a first additional voice feature from a voice uttered by an utterer; extracting, by a second voice feature extractor, a second additional voice feature from the voice; performing, by a sound recognizer, voice recognition on the voice to obtain a voice recognition result; performing, by an automatic interpreter, automatic translation on the voice recognition result to obtain an automatic translation result; and transmitting, by a communication unit, the automatic translation result, the hidden variable, and the second additional voice feature to the correspondent terminal.

In another general aspect, an automatic interpretation apparatus included in a correspondent terminal communicating with an utterer terminal includes: a communication unit configured to receive voice feature information about an utterer and an automatic translation result, obtained by automatically translating a voice uttered in a source language by the utterer in a target language, from the utterer terminal; and a sound synthesizer configured to perform voice synthesis on the basis of the automatic translation result and the voice feature information to output a personalized synthesis voice as an automatic interpretation result. The voice feature information about the utterer includes a hidden variable including a first additional voice result and a voice feature parameter and a second additional voice feature, which are extracted from a voice of the utterer.

Other features and aspects will be apparent from the following detailed description, the drawings, and the claims.

BRIEF DESCRIPTION OF THE DRAWINGS

FIG. 6 is a flowchart for describing an automatic interpretation method performed by a correspondent terminal, according to an embodiment of the present invention.

FIG. 7 is a flowchart for describing an automatic interpretation method performed by an utterer terminal according to an embodiment of the present invention.

DETAILED DESCRIPTION OF EMBODIMENTS

Figure 1:
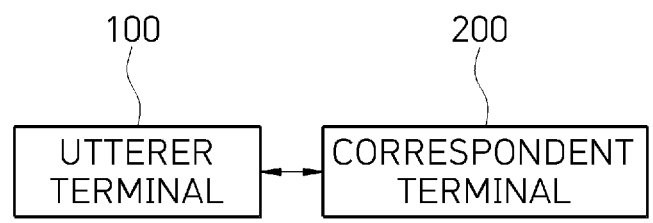
FIG. 1 is a block diagram illustrating a total system configuration for automatic interpretation according to an embodiment of the present invention.

In embodiments of the present invention disclosed in the detailed description, specific structural or functional descriptions are merely made for the purpose of describing embodiments of the present invention. Embodiments of the present invention may be embodied in various forms, and the present invention should not be construed as being limited to embodiments of the present invention disclosed in the detailed description.

Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention.

In the following description, the technical terms are used only for explain a specific exemplary embodiment while not limiting the present invention. The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components.

Hereinafter, embodiments of the present invention will be described in detail with reference to the accompanying drawings. The present invention may, however, be embodied in different forms and should not be construed as limited to the embodiments set forth herein. Like reference numerals refer to like elements throughout.

FIG. 1 is a block diagram illustrating a total system configuration for automatic interpretation according to an embodiment of the present invention.

Referring to FIG. 1, a total system 300 for automatic interpretation according to an embodiment of the present invention may include an utterer terminal 100 and a correspondent terminal 200.

Each of the utterer terminal 100 and the correspondent terminal 200 may perform an automatic interpretation process according to an embodiment. In order to perform an automatic interpretation process, each of the utterer terminal 100 and the correspondent terminal 200 may be a computing device including a data processing function.

The computing device may be a portable mobile device such as a smartphone, a wearable device, a headset device, a notebook computer, a personal digital assistant (PDA), a tablet personal computer (PC), smart glasses, or smartwatch, but is not limited thereto and may be a stationary device such as a desktop computer.

Each of the utterer terminal 100 and the correspondent terminal 200 may have a wired and/or wireless communication function, in addition to a data processing function. The utterer terminal 100 and the correspondent terminal 200 may exchange pieces of information for automatic interpretation by using wired and/or wireless communication.

The wireless communication may include, for example, close-distance wireless communication, mobile communication (for example, 3G communication, 4G communication, or 5G communication), and Internet wireless communication. The close-distance communication may include, for example, Wi-Fi, Bluetooth, etc.

In FIG. 1, it is illustrated that one utterer terminal 100 communicates with one correspondent terminal 200, but the one utterer terminal 100 may communicate with a plurality of correspondent terminals.

Automatic interpretation or automatic speech interpretation performed by each of the utterer terminal 100 and the correspondent terminal 200 may include technologies such as voice recognition, automatic speech recognition or speech-to-text, automatic translation or automatic speech translation, and voice synthesis or speech synthesis.

Therefore, pieces of information exchanged for automatic interpretation by the utterer terminal 100 and the correspondent terminal 200 may include pieces of information needed for voice recognition, pieces of information needed for automatic interpretation, and pieces of information needed for voice synthesis.

Although described below, pieces of information needed for voice synthesis according to an embodiment may include pieces of information associated with additional voice features and pieces of information about hidden variables or latent variables associated with a personal voice feature.

The correspondent terminal 200 according to an embodiment of the present invention may output (reproduce) a personalized synthesis voice similar to a voice of an utterer as an automatic interpretation result by using a unique voice feature (for example, additional voice features and hidden variables associated with a personal voice feature) of the utterer, received from the utterer terminal 100, as pieces of information needed for voice synthesis.

As described above, in an embodiment of the present invention, when the correspondent terminal 200 desires to reproduce the personalized synthesis voice similar to the voice of an utterer as the automatic interpretation result, the correspondent terminal 200 may receive the normalized additional voice features associated with the unique voice feature of the utterer and hidden variables associated with a personal voice feature instead of receiving a source voice file from the utterer terminal 100, and thus, the correspondent terminal 200 may not need to perform a processing process of extracting a voice feature of the utterer from a voice file of the utterer received from the utterer terminal 100 for voice synthesis.

Therefore, because the correspondent terminal 200 does not perform an operation of transmitting and receiving a source voice file of an utterer and an operation of extracting a voice feature of the utterer from the source voice file of the utterer, the correspondent terminal 200 may process automatic interpretation in real time.

Moreover, when a sound synthesizer of the utterer terminal 100 and a sound synthesizer of the correspondent terminal 200 include different neural network structures, because the neural network structures differ, a difference may occur between a personalized synthesis voice reproduced by a voice synthesis process of the correspondent terminal 200 and an utterer voice, or the correspondent terminal 200 may be impossible to perform voice synthesis.

However, in an embodiment of the present invention, the utterer terminal 100 may provide the correspondent terminal 200 with a voice feature (for example, a normalized additional voice feature and a hidden variable associated with a personal voice feature) of the utterer, and the correspondent terminal 200 may allow the sound synthesizer thereof to learn based on the normalized additional voice feature and the hidden variable associated with the personal voice feature. In this case, a voice learning machine may perform voice synthesis in real time without learning, for automatic interpretation.

Therefore, in an embodiment of the present invention, a difference between a tone of a personalized synthesis voice reproduced by the utterer terminal 100 and a tone of a personalized synthesis voice reproduced by the correspondent terminal 200 may be considerably reduced, and dependence on the spec (a neural network structure) of a sound synthesizer installed in each terminal may decrease.

Hereinafter, an internal configuration of each of an utterer terminal and a correspondent terminal for achieving the above-described technical effects will be described in detail.

First, the utterer terminal 100 and the correspondent terminal 200 illustrated in FIG. 1 may be identically designed to perform the same automatic interpretation process.

The correspondent terminal 200 may receive pieces of information (an additional voice feature and a hidden variable), needed for voice synthesis, from the utterer terminal 100 and may perform a voice synthesis process, based thereon. On the other hand, the utterer terminal 100 may perform a voice synthesis process on the basis of the additional voice feature and the hidden variable associated with a personal voice feature, which are received from the correspondent terminal 200.

That is, based on terminals receiving information needed for voice synthesis, an utterer terminal may be a correspondent terminal, and a correspondent terminal may be an utterer terminal.

In an embodiment of the present invention, it may be assumed that a terminal transmitting information needed for voice synthesis does not perform voice synthesis, and a terminal receiving the information performs voice synthesis. In a case where a terminal transmitting information needed for voice synthesis receives information needed for voice synthesis from another terminal, a corresponding terminal may perform voice synthesis.

Figure 2:
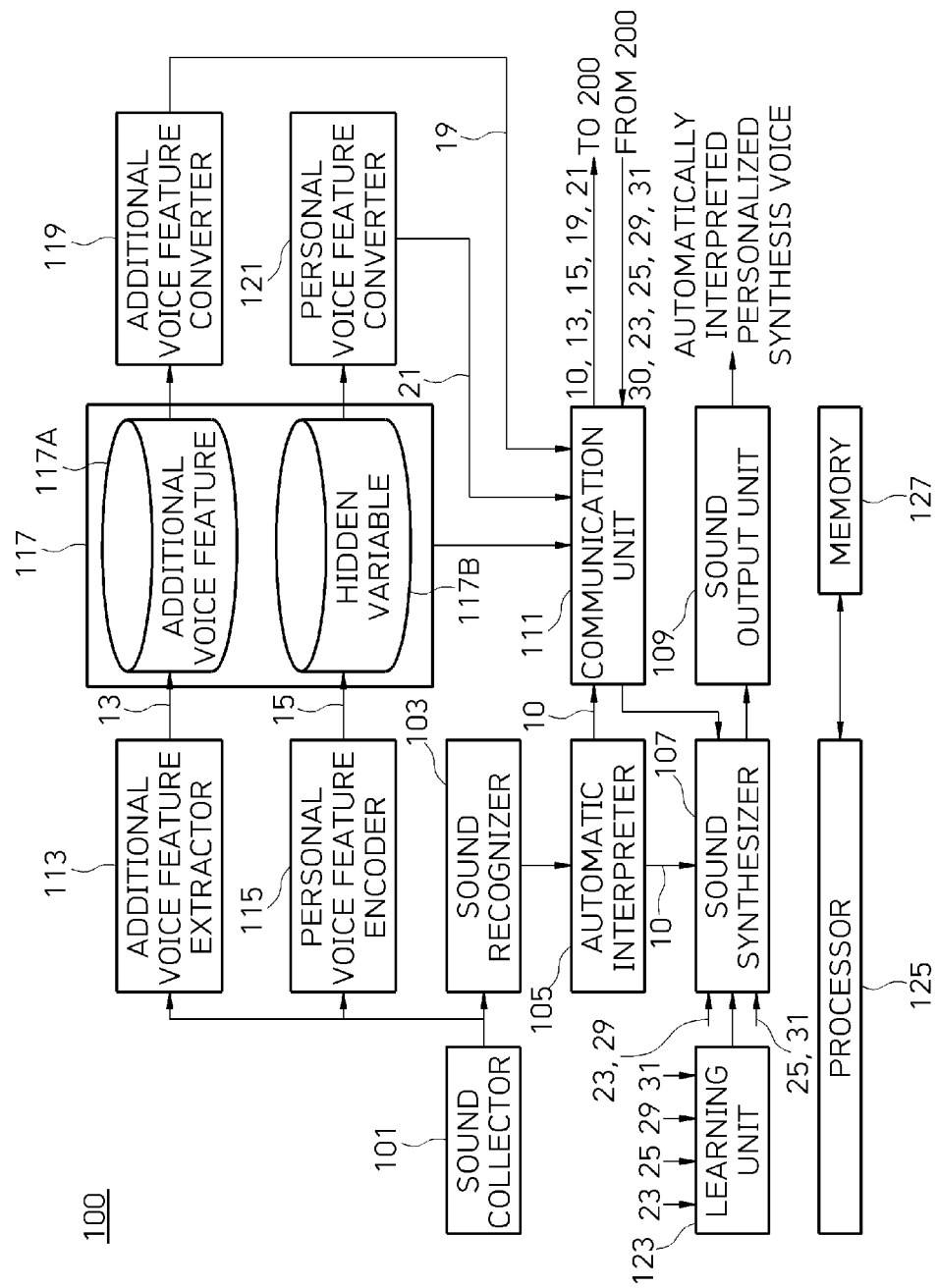
FIG. 2 is a block diagram illustrating an internal configuration of an utterer terminal illustrated in FIG. 1.

FIG. 2 is a block diagram illustrating an internal configuration of the utterer terminal 100 illustrated in FIG. 1.

Referring to FIG. 2, the utterer terminal 100 may be an interpretation-dedicated terminal for automatic interpretation, or may be a terminal including an automatic interpretation apparatus.

The utterer terminal 100 may include a sound collector 101, a sound recognizer 103, an automatic interpreter 105, a sound synthesizer 107, a sound output unit 109, and a communication unit 111, for automatic interpretation. Also, the utterer terminal 100 may further include an additional voice feature extractor 113, a personal voice feature encoder 115, a storage unit 117, an additional voice feature converter 119, a personal voice feature converter 121, and a learning unit 123.

Moreover, the utterer terminal 100 may further include a processor which controls and executes operations of the elements 101, 103, 105, 107, 109, 111, 113, 115, 117, 119, 121, and 123 and a memory 127 which temporarily stores intermediate data and result data obtained through processing by a processor 125 or provides an execution space of a software module or a program executed by the processor 125 and associated with automatic interpretation.

The processor 125 may be referred to as a central processing unit (CPU) and may be a hardware unit which includes one or more arithmetic logic units (ALUs) and a processing register and has a data processing function such as data format conversion on the basis of the ALUs and the processing register.

Sound Collector 101

The sound collector 101 may be an element which collects a voice (a voice signal) uttered in a source language by an utterer, and for example, may be a microphone. In an embodiment of the present invention, a processing operation (for example, a noise removal operation, an amplification operation, a frequency conversion operation, a sampling operation, and an operation of converting analog data into digital data) performed on an analog voice collected by the sound collector 101 may not be an essential feature of the present invention, and thus, technology known to those skilled in the art may be applied to their detail descriptions.

Sound Recognizer 103

The sound recognizer 103 may be a hardware module controlled by the processor 125, or may be a digital circuit embedded into the processor 125. Alternatively, the sound recognizer 103 may be a software module which is loaded into the memory 127 and is executed by the processor 125. The software module may be a program which is programmed in a specific language.

The sound recognizer 103 may perform a voice recognition operation for converting a voice, collected by the sound collector 101, into a sentence (or a text). The voice recognition operation may use, for example, an acoustic model based on probability statistics, a language model, and an end-to-end voice recognition structure, for performing the voice recognition operation.

Here, the acoustic model may be, for example, a deep neural network (DNN) which is one of a Gaussian mixture model (GMM) and a deep learning architecture, and the language model may be, for example, N-gram or a recursive neural network (RNN). Alternatively, the acoustic model and the language model may be integrated as one end-to-end structure.

A voice recognition result obtained through a voice recognition operation performed by the sound recognizer 103 may further include information about a sentence boundary as well as a sentence (or a text) of a source language uttered by an utterer.

Automatic Interpreter 105

The automatic interpreter 105 may be a hardware module controlled by the processor 125, or may be a digital circuit embedded into the processor 125. Alternatively, the automatic interpreter 105 may be a software module which is loaded into the memory 127 and is executed by the processor 125.

The automatic interpreter 105 may convert a voice recognition result (i.e., a sentence (hereinafter referred to as a source language sentence) consisting of a source language), input from the sound recognizer 103, into a sentence (or a text) (hereinafter referred to as a target language sentence) consisting of a target language.

For example, rule-based machine translation (RBMT), corpus-based machine translation (CBMT), statistical based machine translation (SBMT), neural machine translation, and the like may be used for converting a source language sentence into a target language sentence.

In FIG. 1, the sound recognizer 103 and the automatic interpreter 105 may be separated from each other, but may be integrated as one body. That is, a voice recognition operation and an automatic interpretation operation may be integrated as one operation. A type where the sound recognizer 103 and the automatic interpreter 105 are integrated as one body may be referred to as end-to-end automatic interpretation. It may be obvious that the present invention is applied to an end-to-end automatic interpretation apparatus.

Although described below, an operation of extracting an additional voice feature by using the additional voice feature extractor 113 and an operation of extracting a hidden variable associated with a personal voice feature by using the personal voice feature encoder 115 may be included in a voice recognition operation performed by the sound recognizer 103.

Sound Synthesizer 107

The sound synthesizer 107 may be a hardware module controlled by the processor 125, or may be a digital circuit embedded into the processor 125. Alternatively, the sound synthesizer 107 may be a software module which is loaded into the memory 127 and is executed by the processor 125.

The sound synthesizer 107 may synthesize a target language sentence, input from the automatic interpreter 105, with voice features (23 and 25 of FIG. 4) of the correspondent terminal 200 to generate a personalized synthesis voice. In order to generate the personalized synthesis voice, the sound synthesizer 107 may perform a voice synthesis operation based on a neural network.

A neural network structure of the sound synthesizer 107 may include, for example, neural models such as an encoder model and a decoder model each including an RNN. In this case, each of the encoder model and the decoder model may include a plurality of memory cells or a plurality of RNN cells.

The sound synthesizer 107 based on a neural network may be previously learned by the learning unit 123. For example, the learning unit 123 may allow the sound synthesizer 107 to learn by using, as training data, input texts of a plurality of utterers and additional voice features of a plurality of utterers including a correspondent utterer of the correspondent terminal 200.

Hereinafter, the sound synthesizer 107 will be described in detail with reference to FIG. 3.

Figure 3:
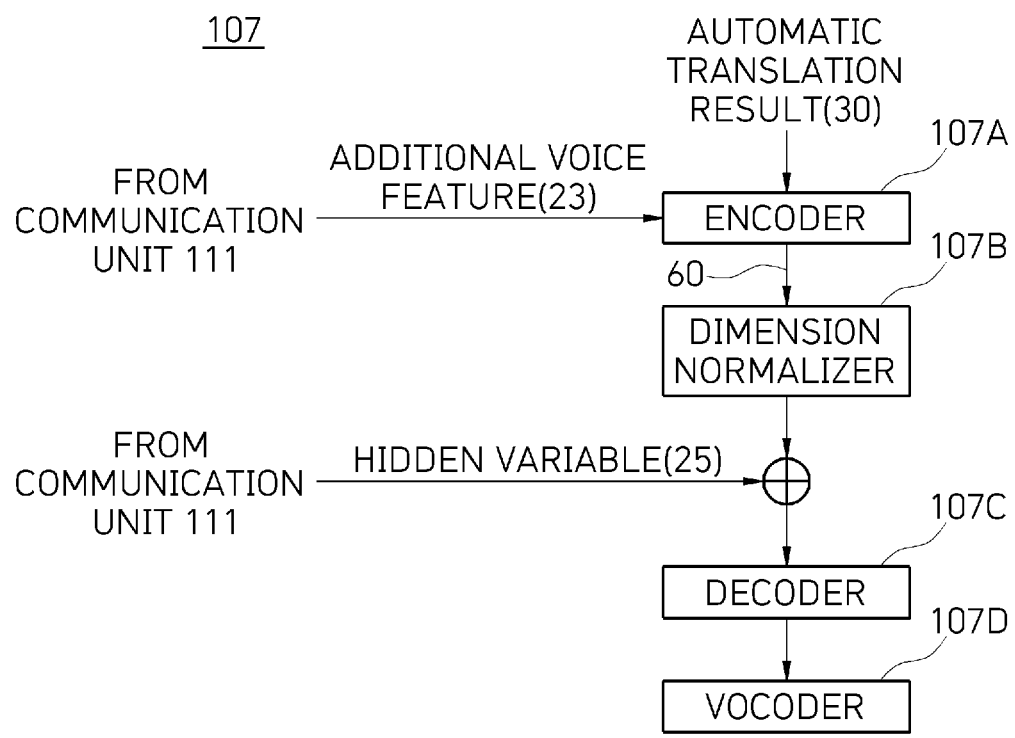
FIG. 3 is a block diagram illustrating an internal configuration of a sound synthesizer illustrated in FIG. 2.

FIG. 3 is a block diagram illustrating an internal configuration of the sound synthesizer 107 illustrated in FIG. 2.

Referring to FIG. 3, the sound synthesizer 107 may include an encoder 107A, a dimension normalizer 107B, a decoder 107C, and a vocoder 107D.

The encoder 107A may be a neural network such as an RNN including a plurality of RNNs and may encode an automatic translation result 10 input from the automatic interpreter 105, an additional voice feature 23 provided through the communication unit 111 from the correspondent terminal 200, and a hidden variable 25 associated with a personal voice feature provided through the communication unit 111 from the correspondent terminal 200. Here, the additional voice feature 23 and the hidden variable 25 may each be information associated with a voice feature of a correspondent utterer extracted by the correspondent terminal 200. Also, the automatic translation result 10 may be replaced with an automatic translation result (30 of FIG. 4) provided through the communication unit 111 from the correspondent terminal 200.

An encoding result output from the encoder 107A may include linguistic content obtained based on the automatic translation result 10 and an acoustic feature obtained based on the additional voice feature 13.

The linguistic content may be, for example, information including a text obtained from the automatic translation result 10 (a target language sentence) and a phoneme extracted from the text.

The acoustic content may be, for example, information associated with a tone (intonation, intensity, pitch, etc.) of a correspondent utterer obtained from the additional voice feature 23 provided from the correspondent terminal 200.

The dimension normalizer 107B may perform an operation of normalizing the encoding result 60 and the hidden variable 25 to the same data dimension so that the encoding result 60 input from the encoder 107A is combined with the hidden variable 25 associated with a personal voice feature provided from the correspondent terminal 200.

A personal voice feature hidden variable may be provided from a personal voice feature encoder 215 included in the correspondent terminal 200. The personal voice feature encoder 215 of the correspondent terminal 200 may be configured in a neural network structure. In this case, when a neural network structure of the personal voice feature encoder 215 differs from a neural network structure of the encoder 107A, the personal voice feature hidden variable 25 and an encoding result 60 from the encoder 107A may have different data dimensions.

When the personal voice feature hidden variable 25 and the encoding result 60 having different data dimensions are input to the decoder 107C described below, the decoder 107C may output an inaccurate decoding result.

In order to obtain an accurate decoding result, the dimension normalizer 107B may normalize the encoding result 60 and the hidden variable 25 to the same data dimension so that data of the encoding result 60 is combined with the hidden variable 25.

When the personal voice feature encoder 215 of the correspondent terminal 200 has a neural network structure which is the same as or similar to a neural network structure of the encoder 107A, a dimension normalization operation performed by the dimension normalizer 107B may not be performed.

The decoder 107C may decode the encoding result 60 and the hidden variable 25 associated with a personal voice feature provided from the correspondent terminal 200. Such a decoding operation may be an operation of generating a parameter for determining a voice of a correspondent utterer. Here, the parameter may be, for example, a feature vector based on a spectrogram.

The vocoder 107D may generate a personalized synthesis voice as an automatic interpretation result on the basis of the parameter input from the decoder 107C. Here, in a case where the decoder 107C directly generates a decoding result as a personalized synthesis voice, a design of the vocoder 107D may be omitted.

As described above, the sound synthesizer 107 may generate a personalized synthesis voice by using, as inputs, an automatic translation result (10 or 30 of FIG. 4), an additional voice feature 23 provided from the correspondent terminal 200, and the hidden variable 25 associated with the personal voice feature provided from the correspondent terminal 200.

Based on a design, the sound synthesizer 107 may perform voice synthesis on the automatic translation result (10 or 30 of FIG. 4) by using only one piece of information among the hidden variable 25 and the additional voice feature 23 provided from the correspondent terminal 200.

Although described below, a voice feature associated with a hidden variable may include more information associated with a tone of a correspondent utterer than a voice feature associated with an additional voice feature. The sound synthesizer 107 may perform voice synthesis on the automatic translation result (10 or 30 of FIG. 4) by using only the hidden variable 25 provided from the correspondent terminal 200. In this case, the encoder 107A of the sound synthesizer 107 may encode only the automatic translation result (10 or 30 of FIG. 4).

Moreover, the sound synthesizer 107 may perform voice synthesis on the automatic translation result (10 or 30 of FIG. 4) by using only the additional voice feature 23 provided from the correspondent terminal 200. In this case, however, the quality of a personalized synthesis voice generated based on voice synthesis may be reduced.

Moreover, the sound synthesizer 107 may perform voice synthesis on the automatic translation result (10 or 30 of FIG. 4) by using a converted (updated or corrected) additional voice feature 23 from the correspondent terminal 200 and/or a converted (updated or corrected) hidden variable 25 from the correspondent terminal 200. In this case, the sound synthesizer 107 may generate a personalized synthesis voice converted (updated) into a tone desired by a correspondent utterer of the correspondent terminal 200 or an utterer of the utterer terminal 100.

In a case where the sound synthesizer 107 desires to convert a personalized synthesis voice converted (updated) into a tone desired by an utterer, although described below, the additional voice feature converter 119 and the personal voice feature converter 121 of the utterer terminal 100 may respectively convert each of an additional voice feature (23 of FIG. 4) and a hidden variable (25 of FIG. 4) received through the communication unit 111 from the correspondent terminal 200 and may transfer a converted additional voice feature and a converted hidden variable to the sound synthesizer 107.

In a case where the sound synthesizer 107 generates a synthesis voice by using only the automatic translation result (10 or 30 of FIG. 4) as an input, the generated synthesis voice may not be a personalized synthesis voice.

Sound Output Unit 109

Referring again to FIG. 1, the sound output unit 109 may reproduce (output) a personalized synthesis voice generated as an automatic interpretation result by the sound synthesizer 107, and for example, may be a speaker.

Communication Unit 111

The communication unit 111 may communicate with the correspondent terminal 200 by wire or wirelessly, for information exchange between an utterer terminal and a correspondent terminal.

The communication unit 111 may transmit, to the correspondent terminal 200, the personal voice feature hidden variable 115 and the additional voice feature 13 stored in the storage unit 117. At this time, the communication unit 111 may further transmit the automation translation result 10, input from the automatic interpreter 105, to the correspondent terminal 200.

On the other hand, the communication unit 111 may receive the additional voice feature 23 and the hidden variable 25 from the correspondent terminal 200 and may transfer the received additional voice feature 23 and hidden variable 25 to the sound synthesizer 107. At this time, the communication unit 111 may further receive an automatic translation result (30 of FIG. 4), obtained by the correspondent terminal 200, from the correspondent terminal 200 and may transfer the automatic translation result (30 of FIG. 4) to the sound synthesizer 107.

Moreover, the communication unit 111 may transmit, to the correspondent terminal 200, the additional voice feature 19 converted (updated) by the additional voice feature converter 119 and/or the hidden variable 21 converted (updated) by the personal voice feature converter 121.

On the other hand, the communication unit 111 may receive an additional voice feature 29 converted (updated) by an additional voice feature converter 219 of the correspondent terminal 200 and/or a hidden variable 31 converted (updated) by a personal voice feature converter 221 of the correspondent terminal 200 and may transfer the additional voice feature 29 and the hidden variable 31 to the sound synthesizer 107.

Additional Voice Feature Extractor 113

The additional voice feature extractor 113 may be a hardware module controlled by the processor 125, or may be a digital circuit embedded into the processor 125. Alternatively, the additional voice feature extractor 113 may be a software module which is loaded into the memory 127 and is executed by the processor 125.

The additional voice feature extractor 113 may extract an additional voice feature 13 (or an additional voice feature) from a voice of an utterer input from the sound collector 101.

The additional voice feature 13 may be transmitted to the correspondent terminal 200 through the communication unit 111, and a sound synthesizer 207 of the correspondent terminal 200 may use the additional voice feature 13 as information needed for voice synthesis.

The additional voice feature extractor 113 may extract, for example, the additional voice feature 13 by using a non-neural network-based algorithm. Here, the non-neural network-based algorithm may be an algorithm which analyzes a feature pattern of a waveform repeatedly shown in a voice signal of an utterer.

A method of extracting a second additional voice feature 13 on the basis of a non-neural network may include, for example, an operation of converting a voice signal of an utterer into a digitized and digitalized waveform, an operation of setting a specific period in a converted digitalized waveform, and an operation of analyzing an amplitude and a period of a waveform on the basis of a waveform analysis algorithm to extract a feature pattern from the set specific period.

In FIG. 1, the additional voice feature extractor 113 is illustrated as one independent block, but is not limited thereto and may be integrated into the sound recognizer 103. In this case, a voice recognition operation performed by the sound recognizer 103 may further include an operation of extracting an additional voice feature.

The additional voice feature may include a voice feature associated with a tone or a style of a voice of an utterer (a voice of a speaker (a talker) representing feeling (calmness, politeness, fear, happiness, affirmation, denial, etc.), intensity, intonation, pitch, speed, and a continuous time.

The additional voice feature extractor 113 may map an additional voice feature, extracted from a voice signal of an utterer, to the voice signal to classify mapping results on the basis of a predetermined time section.

Subsequently, the additional voice feature extractor 113 may digitize the classified mapping results on the basis of a predetermined rule and may store a digitized result as the additional voice feature 13 in the storage unit 117 in the form of a database 117A. Here, the digitized result may be a type of a real number value or a percentage.

An additional voice feature extractor 213 of the correspondent terminal 200 may have the same configuration and function as those of the additional voice feature extractor 113. However, there may merely be a difference in that the additional voice feature extractor 113 extracts the additional voice feature 13 from a voice of an utterer and the additional voice feature extractor 213 extracts an additional voice feature (23 of FIG. 4) from a voice of a correspondent utterer.

Personal Voice Feature Encoder 115

The personal voice feature encoder 115 may be a hardware module controlled by the processor 125, or may be a digital circuit embedded into the processor 125. Alternatively, the personal voice feature encoder 115 may be a software module which is loaded into the memory 127 and is executed by the processor 125.

The personal voice feature encoder 115 may perform an operation of encoding a voice signal of an utterer input from the sound collector 101 to generate a hidden variable 15 including a personal voice feature.

The personal voice feature may include an additional voice feature and a voice feature parameter, or may be information about a combination thereof. Here, the voice feature parameter may be, for example, a feature vector based on a Mel-frequency cepstral coefficient (MFCC).

The hidden variable 15 may be used as information needed for performing a voice synthesis operation by using the sound synthesizer 107 along with the additional voice feature extracted by the additional voice feature extractor 113.

The hidden variable 15 may further include a voice feature parameter such as an MFCC in addition to an additional voice feature similar to the additional voice feature 13, and thus, may be information which includes more information, associated with a voice feature (an utterance tone, an utterance style, etc.) of an utterer, than the additional voice feature 13. In this case, the sound synthesizer 207 of the correspondent terminal 200 may receive only the hidden variable 15 extracted from the utterer terminal 100 and may use only the hidden variable 15 as information needed for voice synthesis.

In order to generate the hidden variable 15, the personal voice feature encoder 115 may be configured in a previously learned neural network structure.

Figure 4:
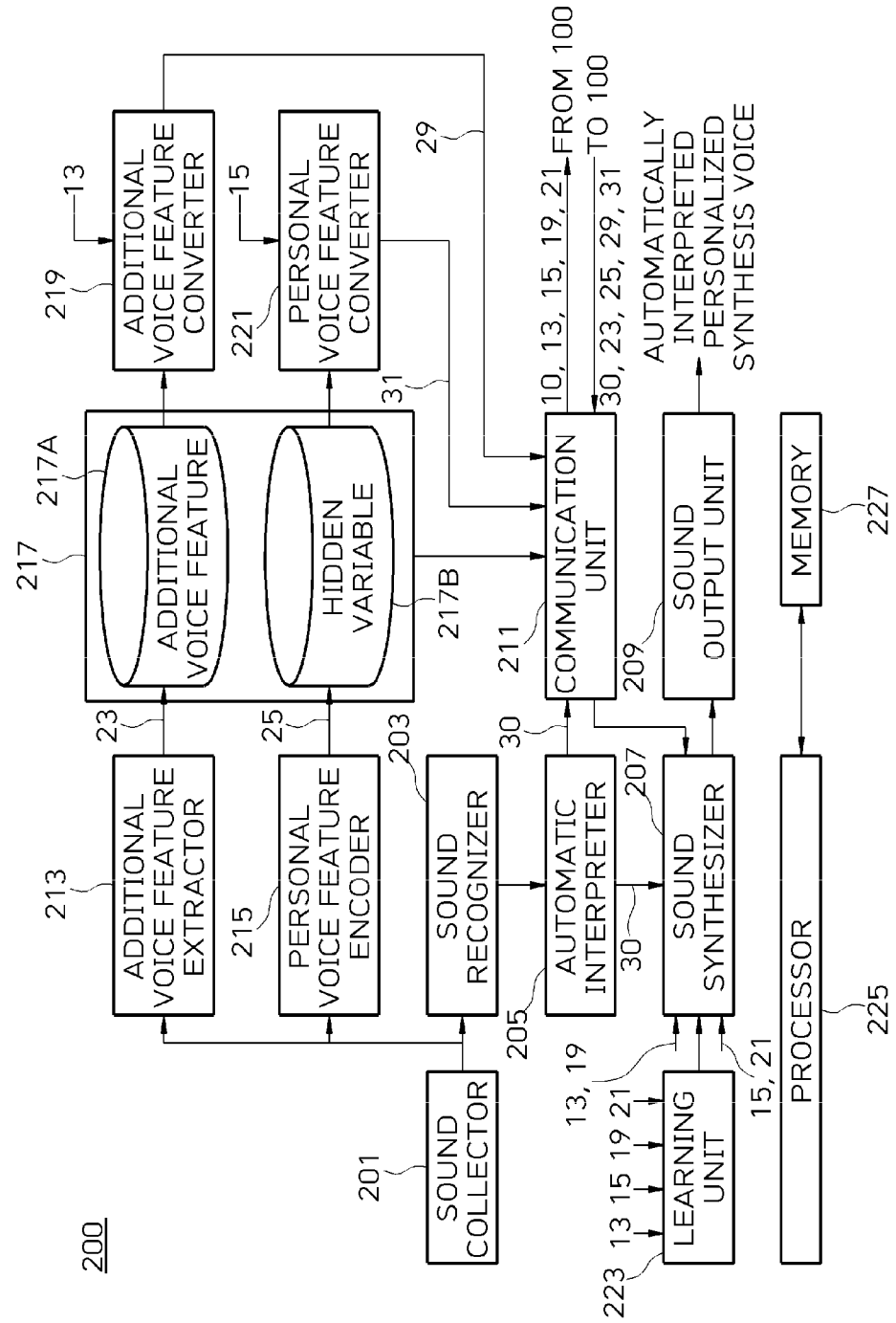
FIG. 4 is a block diagram illustrating an internal configuration of a correspondent terminal illustrated in FIG. 1.

The neural network structure of the personal voice feature encoder 115 may be the same as or different from a neural network structure of the sound synthesizer (207 of FIG. 4). As described above, when a neural network structure differs, although not shown, the sound synthesizer (207 of FIG. 4) of the correspondent terminal 200 may further include a processing block such as a dimension normalizer which normalizes a data dimension.

The sound synthesizer 207 of the correspondent terminal 200 may generate a personalized synthesis voice by using only the additional voice feature 13 provided from the additional voice feature extractor 113, but in order to more increase the accuracy of the personalized synthesis voice, the sound synthesizer 207 may perform voice synthesis by using the hidden variable 15, provided from the additional voice feature extractor 113, as primary information and using the additional voice feature 13, provided from the additional voice feature extractor 113, as secondary information.

On the other hand, the sound synthesizer 207 of the correspondent terminal 200 may perform voice synthesis by using the additional voice feature 13, provided from the additional voice feature extractor 113, as primary information and using the hidden variable 15, provided from the additional voice feature extractor 113, as secondary information.

A neural network structure of the personal voice feature encoder 115 may be learned in a variously modified neural network structure on the basis of a predefined rule or a characteristic (for example, a data dimension) of various training data.

In a case where the neural network structure of the personal voice feature encoder 115 is learned in various neural network structures on the basis of a characteristic of training data, the neural network structure of the personal voice feature encoder 115 of the utterer terminal 100 may differ from a neural network structure of an encoder included in the sound synthesizer 207 of the correspondent terminal 200.

Therefore, a dimension normalization operation may be performed so that a data dimension of the hidden variable 15 generated by the personal voice feature encoder 115 is the same as a data dimension of an encoding result generated by the encoder of the sound synthesizer 207 of the correspondent terminal 200.

An encoding result (i.e., the hidden variable 15) generated by the personal voice feature encoder 115 may be stored in the storage unit 117 in the form of a database 117B.

The personal voice feature encoder 115 and the personal voice feature encoder 215 of the correspondent terminal 200 may have the same configuration and function. However, there may merely be a difference in that the personal voice feature encoder 115 extracts the hidden variable 15 associated with a personal voice feature of an utterer and the personal voice feature encoder 215 extracts the hidden variable 25 associated with a personal voice feature of a correspondent utterer.

Storage Unit 117

The storage unit 117 may be a storage unit which temporarily or permanently stores the additional voice feature 13 output from the additional voice feature extractor 113 in the form of the database 117A and stores the personal voice feature hidden variable 15 output from the personal voice feature encoder 115 in the form of the database 117B and may be implemented as a volatile storage medium or a non-volatile storage medium.

The additional voice feature 13 and the hidden variable 15 stored in the storage unit 117 may be respectively updated to a new additional voice feature and a new hidden variable, which are obtained based on a voice signal newly collected by the sound collector 101.

Additional Voice Feature Converter 119

The additional voice feature converter 119 may be a hardware module controlled by the processor 125, or may be a digital circuit embedded into the processor 125. Alternatively, the additional voice feature converter 119 may be a software module which is loaded into the memory 127 and is executed by the processor 125.

The additional voice feature converter 119 may correct a specific value of the additional voice feature 13 extracted the additional voice extractor 113 or a specific value of the additional voice feature 23 provided from the correspondent terminal 200 on the basis of a request of an utterer to convert the additional voice feature 13 or 23 into an updated additional voice feature.

For example, in a case which converts a voice pitch of an utterer or a correspondent utterer, an operation of converting an additional voice feature may be an operation of adjusting a specific value corresponding to the voice pitch.

An operation of converting an additional voice feature may be performed by an utterer. For example, when an utterer inputs the specific value through a user interface (not shown), the user interface may transfer the specific value to the additional voice feature converter 119, and the additional voice feature converter 119 may convert the additional voice feature 13 or the additional voice feature 23 provided from the correspondent terminal 200 on the basis of the specific value input through the user interface.

On the other hand, when the utterer terminal 100 transmits the additional voice feature 13 to the correspondent terminal 200 through the communication unit 111, the additional voice feature converter 219 of the correspondent terminal 200 may convert the additional voice feature 13 received from the utterer terminal 100 by adjusting the specific value of the received additional voice feature 13.

In this case, when the additional voice feature 13 received by the correspondent terminal 200 is the additional voice feature 19 updated by the additional voice feature converter 119 of the utterer terminal 100, the additional voice feature converter 219 of the correspondent terminal 100 may update (convert) an additional voice feature 29, updated by the utterer terminal 100, to a tone desired by a correspondent utterer of the correspondent terminal 200 once more.

Personal Voice Feature Converter 121

The personal voice feature converter 121 may be a hardware module controlled by the processor 125, or may be a digital circuit embedded into the processor 125. Alternatively, the personal voice feature converter 121 may be a software module which is loaded into the memory 127 and is executed by the processor 125.

The personal voice feature converter 121 may vary a specific value of the hidden variable 15 encoded by the personal voice feature encoder 115 to update the hidden variable 15.

An additional voice feature and a voice feature parameter (for example, an MFCC) included in the hidden variable 15 may each be information hidden in the hidden variable in a processing operation of a neural network, and thus, it is unable to check correlation between the hidden variable and an additional voice feature of a voice uttered by an utterer. Therefore, when an utterer desires to change a hidden variable, a pre-operation of checking correlation between an additional voice feature and a hidden variable may be needed.

For example, in a case which varies a pitch of an utterer voice, a pre-operation may be an operation of analyzing which specific value of a hidden variable is changed.

Alternatively, a pre-operation may be an operation of changing a hidden variable, performing voice synthesis on the basis of a changed hidden variable to obtain a personalized synthesis voice, and analyzing a varied additional voice feature of the personalized synthesis voice and a variation of the varied additional voice feature.

A pre-operation may be performed through learning of a neural network, and when correlation between a specific value of a hidden variable and a specific value of an additional voice feature is checked through the pre-operation, the correlation may be stored in a mapping table.

The personal voice feature converter 121 may receive a specific value of an additional voice feature of a personalized synthesis voice, which is to be uttered by an utterer, through the user interface (not shown) and may change (update) a specific value of a hidden variable corresponding to the specific value of the additional voice feature with reference to the mapping table.

A changed (updated) hidden variable 21 may be transmitted to the correspondent terminal 200 through the communication unit 111, and the hidden variable 21 may be used as information needed for performing voice synthesis by using the sound synthesizer 207 of the correspondent terminal 200.

Moreover, the personal voice feature converter 121 of the correspondent terminal 200 may additionally change (update) the changed (updated) hidden variable 21, received from the utterer terminal 100, to a value desired by the correspondent utterer of the correspondent terminal 200.

Learner 123

The learner 123 may be a hardware module controlled by the processor 125, or may be a digital circuit embedded into the processor 125. Alternatively, the learner 123 may be a software module which is loaded into the memory 127 and is executed by the processor 125.

The learner 123 may be an element which allows the sound learner 107 to learn.

A learning method performed by the learner 123 may be machine learning which includes supervised learning and/or unsupervised learning.

The learner 123 may allow the sound synthesizer 107 to learn by using, as training data, an additional voice feature (23 of FIG. 4), a hidden variable (25 of FIG. 4), a changed additional voice feature (29 of FIG. 4), and a changed hidden variable (31 of FIG. 4), which represent a voice feature of a correspondent utterer received from the correspondent terminal 200.

Figure 5:
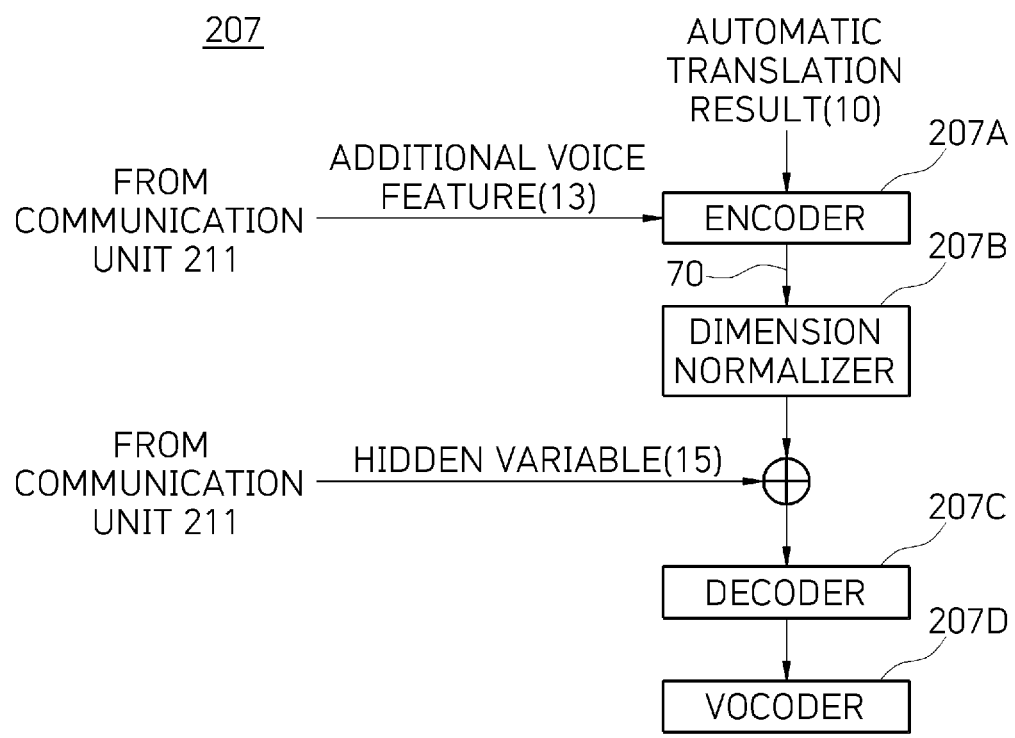
FIG. 5 is a block diagram illustrating an internal configuration of a sound synthesizer illustrated in FIG. 4.

FIG. 4 is a block diagram illustrating an internal configuration of the correspondent terminal 200 illustrated in FIG. 1, and FIG. 5 is a block diagram illustrating an internal configuration of a sound synthesizer illustrated in FIG. 4.

Referring to FIG. 4, the correspondent terminal 200 may include a sound collector 201, a sound recognizer 203, an automatic interpreter 205, a sound synthesizer 207, a sound output unit 209, a communication unit 211, an additional voice feature extractor 213, a personal voice feature encoder 215, a storage unit 217, an additional voice feature converter 219, a personal voice feature converter 221, and a learning unit 223.

The elements 201, 203, 205, 207, 209, 211, 213, 215, 217, 219, 221, and 223 may respectively have the same structures and functions as those of the elements 101, 103, 105, 107, 109, 111, 113, 115, 117, 119, 121, and 123 illustrated in FIG. 2.

Therefore, the descriptions of the elements 101, 103, 105, 107, 109, 111, 113, 115, 117, 119, 121, and 123 may be applied to the elements 201, 203, 205, 207, 209, 211, 213, 215, 217, 219, 221, and 223.

In a case where the correspondent terminal 200 receives the automatic translation result 10, the additional voice feature 13, and the hidden variable 15 from the utterer terminal 100, only elements relevant to processing of the automatic translation result 10, the additional voice feature 13, and the hidden variable 15 will be briefly described below.

First, the communication unit 211 may receive the automatic translation result 10, the additional voice feature 13, and the hidden variable 15. In this case, the communication unit 211 may not receive the automatic translation result 10 and may receive only the additional voice feature 13 and the hidden variable 15 associated with a personal voice feature.

When the communication unit 211 of the correspondent terminal 200 receives the automatic translation result 10, the additional voice feature 13, and the hidden variable 15 associated with a personal voice feature from the utterer terminal 100, the communication unit 211 may transfer the automatic translation result 10, the additional voice feature 13, and the hidden variable 15 to the sound synthesizer 207.

The sound synthesizer 207 may perform voice synthesis on the automatic translation result transmitted from the utterer terminal 100 by using the automatic translation result 10, the additional voice feature 13, and the hidden variable 15 transferred from the communication unit 211 to reproduce (output) a personalized synthesis voice.

On the other hand, when the correspondent terminal 200 receives only the additional voice feature 13 and the hidden variable 15 from the utterer terminal 100, the sound synthesizer 207 may perform voice synthesis on an automatic translation result 30 input from the automatic interpreter 205 by using the additional voice feature 13 and the hidden variable 15 received from the utterer terminal 100.

The additional voice feature 13 and the hidden variable 15 may each be updated to a tone desired by the correspondent utterer by using the additional voice feature converter 219 and the personal voice feature converter 221.

The sound synthesizer 207 may perform voice synthesis on the automatic translation result 10 provided from the utterer terminal 100 or the automatic translation result 30 provided from the automatic interpreter 205 by using an updated additional voice feature and an updated hidden variable.

Moreover, the sound synthesizer 207 may perform voice synthesis on the automatic translation result 10 provided from the utterer terminal 100 or the automatic translation result 30 provided from the automatic interpreter 205 by using an updated additional voice feature 19 and an updated hidden variable 21 obtained through updating by the utterer terminal 100.

The learner 223 may allow the sound synthesizer 207 to learn by using the additional voice feature 13 and the hidden variable 15, received from the utterer terminal 100, as training data.

Moreover, the learner 223 may allow the sound synthesizer 207 to learn by using the updated additional voice feature 19 and the updated hidden variable 21 received from the utterer terminal 100.

Moreover, when the additional voice feature converter 219 and the personal voice feature converter 221 of the correspondent terminal 200 update the additional voice feature 13 and the hidden variable 15 received from the utterer terminal 100, the learner 223 may allow the sound learner 207 to learn by using the updated additional voice feature 19 and the updated hidden variable 21 as training data.

Reference numeral "23" may refer to the additional voice feature 23 which is generated by the additional voice feature extractor 213 on the basis of a voice signal collected by the sound collector 201, and reference numeral "25" may refer to the hidden variable 25 associated with a personal voice feature which is generated by the personal voice feature encoder 215 on the basis of the voice signal collected by the sound collector 201.

Reference numeral "30" may refer to an automatic translation result which is generated by the automatic interpreter 205 on the basis of a voice recognition result input from the sound recognizer 203.

A neural network structure of the personal voice feature encoder 215 in the correspondent terminal 200 may be the same as or different from a neural network structure of the personal voice feature encoder 115 in the utterer terminal 100.

Moreover, the neural network structure of the personal voice feature encoder 215 in the correspondent terminal 200 may be the same as or different from a neural network structure of an encoder (107A of FIG. 3) included in the sound synthesizer 107 in the utterer terminal 100.

Moreover, a neural network structure of an encoder 207A included in the sound synthesizer 207 in the correspondent terminal 200 may be the same as or different from the neural network structure of the encoder (107A of FIG. 3) included in the sound synthesizer 107 in the utterer terminal 100.

As described above, because the neural network structures of the encoders 107A and 207A in different terminals differ, a problem may occur where a decoder 107D or 207D of a sound synthesizer included in the utterer terminal 100 or the correspondent terminal 200 decodes encoding results of different data dimensions.

However, in an embodiment of the present invention, because the sound synthesizer included in the utterer terminal 100 or the correspondent terminal 200 performs an operation of normalizing a data dimension to the same dimension, an error of a decoding result caused by a mismatch between data dimensions may be minimized.

That is, dependence on the spec (a neural network structure) of a sound synthesizer (107 or 207) installed in each terminal may decrease, and thus, in a case where the utterer terminal 100 and the correspondent terminal 200 reproduce a personalized synthesis voice as an automatic translation result on the basis of a voice feature of an utterer, the utterer terminal 100 and the correspondent terminal 200 may provide the personalized synthesis voice as the automatic translation result on the basis of a voice feature of the same utterer.

The internal elements 207A to 207D of the sound synthesizer 207 illustrated in FIG. 5 may have the same functions as those of the internal elements 107A to 107D of the sound synthesizer 107 illustrated in FIG. 3. Therefore, descriptions of the internal elements 107A to 107D of the sound synthesizer 107 illustrated in FIG. 3 may be applied to the internal elements 207A to 207D of the sound synthesizer 207.

There may merely be a difference in that the sound synthesizer 207 of the correspondent terminal 200 performs voice synthesis on the automatic translation result 10 on the basis of the automatic translation result 10, the additional voice feature 13, and the hidden variable 15 received from the utterer terminal 100 and the sound synthesizer 107 of the utterer terminal 100 performs voice synthesis on the automatic translation result 30 on the basis of the automatic translation result 30, the additional voice feature 23, and the hidden variable 25 received from the correspondent terminal 200.

FIG. 6 is a flowchart for describing an automatic interpretation method performed by a correspondent terminal, according to an embodiment of the present invention.

In order to clearly distinguish the terms, an additional voice feature included in the hidden variable 15 or 25 obtained by the personal voice feature encoder 115 or 215 illustrated in FIGS. 2 and 4 may be referred to as a first additional voice feature, and an additional voice feature 13 or 23 extracted by the additional voice extractor 113 or 213 may be referred to as a second additional voice feature.

Moreover, the personal voice feature encoder 115 or 215 illustrated in FIGS. 2 and 4 may be referred to as a first voice feature extractor, and the additional voice feature extractor 113 or 213 may be referred to as a second voice feature extractor.

Moreover, the personal voice feature converter 121 or 221 illustrated in FIGS. 2 and 4 may be referred to as a first voice feature converter, and the additional voice feature converter 119 or 219 may be referred to as a second voice feature converter.

Referring to FIG. 5, first, in step S510, a process of receiving, by the communication unit 211 of the correspondent terminal 200, voice feature information extracted from a voice uttered by an utterer and the automatic translation result 10 from the utterer terminal 100 may be performed.

Subsequently, in step S520, a process of performing, by the sound synthesizer 207 of the correspondent terminal 200, voice synthesis on the automatic translation result 10 and the voice feature information 13 and 15 to output a personalized synthesis voice as an automatic interpretation result may be performed.

The voice feature information provided from the utterer terminal 100 may include a hidden variable (15 of FIG. 15) and a second additional voice feature (13 of FIG. 2).

The hidden variable (15 of FIG. 2) may be information which is extracted by a first voice feature extractor (115 of FIG. 2) of the utterer terminal 100 on the basis of a neural network algorithm and may include a first additional voice feature and a voice feature parameter. Here, the voice feature parameter may be, for example, a feature vector based on an MFCC.

The second additional voice feature (13 of FIG. 2) may be information which is extracted by a second voice feature extractor (113 of FIG. 2) of the utterer terminal 100 on the basis of a non-neural network algorithm. Here, the non-neural network algorithm may be an algorithm which analyzes a waveform feature repeatedly shown in a voice of the utterer.

Each of the second additional voice feature 13 and the first additional voice feature included in the hidden variable 15 may be information associated with the intonation, intensity, pitch, and speed of the voice of the utterer and may be a feature associated with a tone of the voice uttered by the utterer.

In step S520, a process of outputting a personalized synthesis voice will be described below.

First, a process of encoding, by an encoder (207A of FIG. 5), the automatic translation result 10 and the second additional voice feature to obtain and output an encoding result may be performed.

Subsequently, a process of normalizing, by a dimension normalizer (207B of FIG. 5), a data dimension of the encoding result (70 of FIG. 5) and a data dimension of the hidden variable 15 to the same data dimension may be performed.

Subsequently, a process of decoding, by a decoder 207C, the hidden variable and the encoding result normalized to the same data dimension to generate the personalized synthesis voice may be performed.

Alternatively, in a case where the decoder 207C does not generate the personalized synthesis voice and generates a parameter for determining the voice of the utterer, a process of outputting, a vocoder (207D of FIG. 5), a personalized synthesis voice on the basis of a parameter input from the decoder (207C of FIG. 5) may be further performed. Here, the parameter may be, for example, a feature vector based on a spectrogram.

In an automatic interpretation method performed by the correspondent terminal 200, in a case where a correspondent utterer of the correspondent terminal 200 desires to convert a tone of the voice uttered by the utterer into another tone, a process of adjusting, by a first voice feature adjuster (221 of FIG. 4), a specific value of a hidden variable (15 of FIG. 2) provided from the utterer terminal 100 to update the hidden variable (15 of FIG. 2) and a process of adjusting, by a second voice feature adjuster (219 of FIG. 4), a specific value of a second additional voice feature (13 of FIG. 2) provided from the utterer terminal 100 to update the second additional voice feature 13 may be further performed.

In a case which updates the hidden variable (15 of FIG. 2) and the second additional voice feature (13 of FIG. 2) provided from the utterer terminal 100, a process of performing, by a sound synthesizer (207 of FIG. 4) of the correspondent terminal 200, voice synthesis on the basis of the updated hidden variable and the updated second additional voice feature to output a personalized synthesis voice having the other tone desired by the utterer may be performed.

FIG. 7 is a flowchart for describing an automatic interpretation method performed by an utterer terminal according to an embodiment of the present invention.

In order to clearly distinguish the terms, an additional voice feature included in the hidden variable 15 or 25 obtained by the personal voice feature encoder 115 or 215 illustrated in FIGS. 2 and 4 may be referred to as a first additional voice feature, and an additional voice feature 13 or 23 extracted by the additional voice extractor 113 or 213 may be referred to as a second additional voice feature.

Moreover, the personal voice feature encoder 115 or 215 illustrated in FIGS. 2 and 4 may be referred to as a first voice feature extractor, and the additional voice feature extractor 113 or 213 may be referred to as a second voice feature extractor.

Moreover, the personal voice feature converter 121 or 221 illustrated in FIGS. 2 and 4 may be referred to as a first voice feature converter, and the additional voice feature converter 119 or 219 may be referred to as a second voice feature converter.

Referring to FIG. 7, first, in step S710, a process of extracting, by a first voice feature extractor (115 of FIG. 2), a hidden variable (15 of FIG. 2), including a first additional voice feature and a voice feature parameter, from a voice uttered by an utterer may be performed. Here, a neural network algorithm may be used for extracting the hidden variable (15 of FIG. 2).

Subsequently, in step S720, a process of extracting, by a second voice feature extractor (113 of FIG. 2), a second additional voice feature (13 of FIG. 2) from the voice may be performed. Here, a non-neural network algorithm may be used for extracting the second additional voice feature (13 of FIG. 2). The non-neural network algorithm may be, for example, an algorithm which analyzes a waveform feature repeatedly shown in a voice of the utterer.

Subsequently, in step S730, a process of performing, by a voice recognizer (103 of FIG. 2), voice recognition on the voice to obtain a voice recognition result may be performed.

Subsequently, in step S740, a process of performing, by an automatic interpreter (105 of FIG. 2), automatic interpretation on the voice recognition result to obtain an automatic translation result may be performed.

Subsequently, in step S750, a process of transmitting, by a communication unit (111 of FIG. 2), the automatic translation result 10, the hidden variable 15, and the second additional voice feature 13 to the correspondent terminal 200 may be performed so that the correspondent terminal 200 performs voice synthesis on the automatic translation result on the basis of the hidden variable and the second additional voice feature.

Optionally, in an automatic interpretation method performed by the utterer terminal 100, a process of adjusting, by a first voice feature adjuster (121 of FIG. 2), a specific value of the hidden variable 15 to update the hidden variable 15 and a process of adjusting, by a second voice feature adjuster (119 of FIG. 2), a specific value of the second additional voice feature 13 to update the second additional voice feature 13 may be further performed.

When the hidden variable 15 and the second additional voice feature 13 are updated, a process of transmitting, by the communication unit 111, the automatic translation result 10, the updated hidden variable 15, and the updated second additional voice feature 13 to the correspondent terminal 200 may be performed so that the correspondent terminal 200 performs voice synthesis on the automatic translation result on the basis of the updated hidden variable and the updated second additional voice feature.

Automatic translation in step S740 may be performed by the correspondent terminal 200. In this case, a process of transmitting, by the communication unit (111 of FIG. 2), the voice recognition result to the correspondent terminal 200 may be performed so that the correspondent terminal 200 performs automatic translation on the voice recognition result which is obtained in step S730.

According to the embodiments of the present invention, an utterer terminal may not transmit a voice file of a personalized synthesis voice, which is an automatic interpretation result, to a correspondent terminal and may transmit normalized voice feature information (for example, an additional voice feature and a hidden variable including the same) extracted from a voice uttered by a user of the utterer terminal, and thus, the correspondent terminal may output, as an automatic interpretation result, a personalized synthesis voice similar to a user voice of the utterer terminal.

Moreover, a user may freely correct a specific value of voice feature information to convert a personalized synthesis voice into a tone desired by the user.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An automatic interpretation method performed by a correspondent terminal communicating with an utterer terminal, the automatic interpretation method comprising:
receiving, by a communication unit, voice feature information about an utterer and an automatic translation result, obtained by automatically translating a voice uttered in a source language by the utterer in a target language, from the utterer terminal; and
performing, by a sound synthesizer, voice synthesis on the basis of the automatic translation result and the voice feature information to output a personalized synthesis voice as an automatic interpretation result,
wherein the voice feature information about the utterer comprises a hidden variable including a first additional voice result and a voice feature parameter and a second additional voice feature, which are extracted from a voice of the utterer,
wherein the automatic interpretation method further comprises:
in a case where a correspondent utterer of the correspondent terminal desires to change a tone of the voice, uttered by the utterer, to another tone,
adjusting, by a first voice feature adjuster, a specific value of the hidden variable to update the hidden variable; and
adjusting, by a second voice feature adjuster, a specific value of the second additional voice feature to update the second additional voice feature, and
wherein the adjusting of the specific value of the hidden variable to update the hidden variable is adjusting the specific value of the hidden variable corresponding to the specific value of the second additional voice feature, based on a mapping table representing a correlation between the specific value of the second additional voice feature and the specific value of the hidden variable.

2. The automatic interpretation method of claim 1, wherein the hidden variable is extracted by the utterer terminal on the basis of a neural network algorithm.

3. The automatic interpretation method of claim 1, wherein the second additional voice feature is extracted by the utterer terminal on the basis of a non-neural network algorithm.

4. The automatic interpretation method of claim 3, wherein the non-neural network algorithm is an algorithm which analyzes a waveform feature repeatedly shown in the voice of the utterer.

5. The automatic interpretation method of claim 1, wherein each of the first and second additional voice features is a voice feature associated with a tone or style of the voice of the utterer representing intonation, intensity, pitch, and speed of the voice of the utterer.

6. The automatic interpretation method of claim 1, wherein the outputting of the personalized synthesis voice as the automatic interpretation result comprises:
encoding, by an encoder, the automatic translation result and the second additional voice feature to obtain and output an encoding result;
normalizing, by a dimension normalizer, a data dimension of the encoding result and a data dimension of the hidden variable to the same data dimension; and
decoding, by a decoder, the hidden variable and the encoding result normalized to the same data dimension to generate the personalized synthesis voice.

7. The automatic interpretation method of claim 1, wherein the outputting of the personalized synthesis voice as the automatic interpretation result comprises performing voice synthesis on the basis of the updated hidden variable and the updated second additional voice feature to output a personalized synthesis voice, having the other tone desired by the correspondent utterer, as the automatic interpretation result.

8. An automatic interpretation apparatus included in a correspondent terminal communicating with an utterer terminal, the automatic interpretation apparatus comprising:
a communication unit configured to receive voice feature information about an utterer and an automatic translation result, obtained by automatically translating a voice uttered in a source language by the utterer in a target language, from the utterer terminal; and a sound synthesizer configured to perform voice synthesis on the basis of the automatic translation result and the voice feature information to output a personalized synthesis voice as an automatic interpretation result, wherein the voice feature information about the utterer comprises a hidden variable including a first additional voice result and a voice feature parameter and a second additional voice feature, which are extracted from a voice of the utterer, wherein the automatic interpretation apparatus further comprises:

in a case where a correspondent utterer of the correspondent terminal desires to change a tone of the voice, uttered by the utterer, to another tone, a first voice feature adjuster configured to adjust a specific value of the hidden variable to update the hidden variable; and a second voice feature adjuster configured to adjust a specific value of the second additional voice feature to update the second additional voice feature, and wherein the first voice feature adjuster configured to adjust the specific value of the hidden variable to update the hidden variable is adjusting the specific value of the hidden variable corresponding to the specific value of the second additional voice feature, based on a mapping table representing a correlation between the specific value of the second additional voice feature and the specific value of the hidden variable.

9. The automatic interpretation apparatus of claim 8, wherein the sound synthesizer performs voice synthesis on the basis of the automatic translation result, the updated hidden variable, and the updated second additional voice feature to output the personalized synthesis voice as an automatic interpretation result.

10. The automatic interpretation apparatus of claim 8, wherein the sound synthesizer comprises:

an encoder configured to encode the automatic translation result and the second additional voice feature to obtain and output an encoding result;

a dimension normalizer configured to normalize a data dimension of the encoding result and a data dimension of the hidden variable to the same data dimension; and a decoder configured to decode the hidden variable and the encoding result normalized to the same data dimension to generate the personalized synthesis voice.

11. The automatic interpretation apparatus of claim 8, further comprising:

a first voice feature extractor configured to extract a hidden variable C, including a voice feature parameter B and a first additional voice feature A representing a tone feature of a correspondent utterer of the correspondent terminal, from a voice uttered by the correspondent utterer on the basis of a neural network algorithm;

a second voice feature extractor configured to extract a second additional voice feature D representing a tone feature of the correspondent utterer from the voice uttered by the correspondent utterer on the basis of a non-neural network algorithm;

a sound recognizer configured to perform voice recognition on the voice uttered by the correspondent utterer to obtain a voice recognition result; and an automatic interpreter configured to perform automatic translation on the voice recognition result to obtain an automatic translation result E, wherein the communication unit transmits the hidden variable C, the second additional voice feature D, and the automatic translation result E to the correspondent terminal so that the correspondent terminal performs the voice synthesis on the basis of the hidden variable C, the second additional voice feature D, and the automatic translation result E.

* * * * *